Dec. 1, 1959    J. D. HUGHSON    2,915,623
FREQUENCY RESPONSIVE TRAIN SPEED CONTROL SYSTEM
WITH DIRECT CURRENT CHECK CIRCUIT
Filed Oct. 19, 1955

*INVENTOR.*
J.D. HUGHSON
BY
Forest B. Hitchcock
HIS ATTORNEY ized Dec. 1, 1959

United States Patent Office 2,915,623
Patented Dec. 1, 1959

2,915,623

FREQUENCY RESPONSIVE TRAIN SPEED CONTROL SYSTEM WITH DIRECT CURRENT CHECK CIRCUIT

J Donald Hughson, Brighton, N.Y., assignor to General Railway Signal Company, Rochester, N.Y.

Application October 19, 1955, Serial No. 541,503

5 Claims. (Cl. 246—182)

This invention relates to train speed control systems for railroads, and relates more particularly to frequency responsive speed governing means, together with check circuit means for checking the integrity of a system.

A general type of train speed control system employs a frequency generator which is driven by an axle of a locomotive, the frequency of the output of the generator varying in accordance with train speed. The output of the generator is then applied to train control circuit apparatus which functions to operate an electro-pneumatic valve (commonly called an EP valve). The EP valve is operable to cause service applications of brakes whenever the indicated speed of the train exceeds the maximum speed which is permissible at a particular time in a restricted territory. Since safety considerations are involved in the circuit means for controlling the EP valve, it is desirable to provide a check circuit for checking the integrity of the control circuit means.

The present invention contemplates the use of a frequency generator of the type described in the U.S. Patent No. 2,651,734 of O. S. Field, dated September 8, 1953. The output of the generator is selectively applied to high-pass filters, each of which is capable of passing generated energy only when the frequency exceeds a particular magnitude. In other words, each filter detects train speeds which exceed particular speed levels. The selective application of the generator output to the filters is effected by apparatus which is controlled in accordance with speed restriction conditions which exist at any time. In addition to frequency responsive characteristics, each filter is arranged to be capable of passing direct current energy.

The present invention further proposes that direct-current energy be applied by a battery, or other source of direct current, to the output winding of the generator. The direct-current energy and/or any generated energy passed by a filter is utilized in energizing a detection relay. When the detection relay is energized solely by direct-current energy it acts in combination with a slow-acting repeater relay to cause periodic interruptions of the direct current energy. The detection relays thereby perform cyclical operations when supplied with direct current only. Energy applied to the detection relay by the generator, however, causes the sustained energization of the detection relay and its repeater. The detection relays are used to operate apparatus which controls an EP valve. When such relay operation is periodic the EP valve is held open, thereby preventing the automatic application of brakes; and when the detection relays are held energized by generator energy passed by a filter the EP valve is operated to cause the automatic application of brakes unless existing speed restricting conditions are acknowledged manually by the locomotive engineman. Thus, the EP valve is held open only as long as periodic operations are performed by the detection relays; and the sustained energization or deenergization of the detection relays causes the closing of the EP valve. The EP valve is thereby operated to cause the automatic application of brakes whenever train speeds are excessive or whenever the control circuit means is opened; and the continuity of the control circuits is checked by the applied direct-current energy.

In view of the preceding considerations, an object of the present invention is to provide a frequency responsive train speed control system which includes a direct current check circuit for checking the integrity of the system.

Another object of this invention is to provide a frequency responsive train speed control system, including a direct current check circuit, in which high-pass filters capable of passing direct current are employed.

Other objects, purposes and characteristic features of the present invention will be in part obvious from the accompanying drawings, and in part pointed out as the description of the invention progresses.

In the accompanying drawings:

Fig. 1 shows diagrammatically the apparatus and circuit structure which constitute one embodiment of the present invention; and Fig. 2 shows diagrammatically a high-pass filter employed in the present invention for passing energies having particular frequencies and direct-current energy.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (—) are employed to indicate the positive and negative terminals respectively of suitable batteries, or other sources of direct current; and the circuits with which these symbols are used, always have current flowing in the same direction.

In Fig. 1 an axle and wheels of a locomotive are shown occupying the rails of a track section 10T. The track section 10T is assumed to be a part of signal-governed territory in which speed restrictions are enforced in accordance with traffic conditions.

It is assumed that coded track circuit means are employed to enforce speed restrictions. Such coded track circuits include wayside apparatus (not shown) which applies energy pulses to the rails at various rates which vary in accordance with traffic conditions. A rate of 75 pulses per minute, for example, may be applied to the rails when traffic conditions require trains to travel at slow speeds, while arbitrarily selected rates of 120 and 180 pulses per minute can be used to designate medium and high speed conditions, respectively.

Code energy is detected by receiving coils 12 and 13 which are mounted on the locomotive in advance of the wheels. Energy induced in the receiving coils by code energy is applied to speed control relays through an amplifier and various decoding units.

The actual arrangement of the wayside coding apparatus and train-carried code detecting apparatus can be of any of a number of well-known forms such as described, for example, in the U.S. Patent No. 2,223,131 of W. H. Reichard et al., dated November 26, 1940. Relying on the Reichard et al. patent for a complete description of coded signal control apparatus, the present disclosure will be concerned with only the train-carried apparatus which cooperates with the circuit structure of the present invention.

Whenever code energy is detected by the receiving coils 12 and 13, a code following relay CR is periodically energized at a rate corresponding to the code rate received. A slow-acting front contact repeater relay CRFP is energized periodically by front contact 14 of relay CR. Back contact 14 of relay CR periodically energizes a low-speed control relay 75R through front contact 15 of relay CRFP. Relay 75R is also slow-acting; and relays CRFP and 75R are capable of retaining their armatures under conditions of periodic energization. Relay 75R is thereby caused to pick up and hold its armature when codes of any of the selected rates are detected.

When relay CR is caused to be operated by 120 or 180 rate codes, respective medium-speed and high-speed control relays 120R and 180R are selectively energized by circuit means to be described. Contact 16 of relay CR applies (+) energy to the extremities, alternately, of a transformer winding, the center of the winding being connected to (−) energy. The magnetic flux in the core of the transformer is thereby caused to periodically reverse its direction, resulting in the inducing of an alternating voltage in the secondary winding of the transformer. When the induced voltage alternates at a rate corresponding to the medium-speed (120 rate) control code rate, relay 120R is energized through a decoding unit 120DU. Similarly, relay 180R is energized through a decoding unit 180DU when the induced voltage has a rate corresponding to the high-speed (180 rate) control code rate. The decoding units 120DU and 180DU are arranged, as described in the above Reichard et al. patent, to be capable of permitting operations of their associated relays only when the particular respective code rates are detected.

The speed of the locomotive is indicated by a frequency generator G which is shown driven by the axle 11 of the locomotive. Any of a number of types of generators can be used, as long as the frequency of the output energy of the generator varies according to the speed of rotation of the axle 11. It can be assumed that the generator G is of the type described in the U.S. Patent No. 2,651,734 of O. S. Field, dated September 8, 1953. This generator comprises a rotor member having peripheral teeth which are disposed between other peripheral teeth located on a stator member and a shunt member. A permanent magnet is included in the rotor structure. As the rotor member rotates the alignments of the teeth on the rotor relative to the teeth on the stator and shunt members are such that magnetic flux from the permanent magnet passes alternately through the stator member and the shunt member. An intermittent magnetic flux is thereby produced in the stator member. A field winding 18 associated with the stator member is linked by the intermittent magnetic flux, resulting in the inducing of a voltage across the winding. The output of the generator, therefore, consists of energy pulses which are produced at frequencies which are proportional to the speed of rotation of the locomotive axle 11, and therefore proportional to the speed of the locomotive.

The output of the generator is selectively applied to filter units L-MPH, M-MPH and H-MPH which are related to low, medium and high train speeds, respectively. Each of the filter units is assumed to be a high-pass filter capable of passing energy having a frequency above a predetermined level. The filter unit L-MPH, for example, is arranged to have characteristics such that a substantial amount of generated energy can be passed only when the frequency of the energy exceeds the frequency which corresponds to the predetermined upper limit of the low-speed range. The frequency corresponding to the upper limit of the medium-speed range must be exceeded, similarly, if filter unit M-MPH is to pass a substantial amount of energy; and filter unit H-MPH functions in a similar manner when the frequency denoting the upper limit of the high-speed range is exceeded.

The various filter units are arranged to be capable of passing direct current energy. The structure of the filters (see Fig. 2) will be described later in greater detail.

Energy from the generator is selectively applied to the various filter units in accordance with speed restriction conditions as detected by the speed control relays 75R, 120R, and 180R. When medium-speed restrictions are in effect, for example, the generator output is applied to the filter unit M-MPH which will pass energy only if the speed of the train exceeds the medium-speed limit.

Energy passed by the filter units is utilized in energizing a detection relay D through a rectifier. When the train is not moving, or when it is moving at a speed below an enforced speed limit, no generated output energy is applied to relay D. However, direct current energy is applied to relay D by a battery B which is connected to the field winding 18 of generator G. Relay D and a slow-acting repeater relay DP can both be energized by the application of direct current energy, but relay DP acts when energized to interrupt such energy supplied by the battery B. Thus, relays D and DP perform cyclical operations when direct current energy only is applied through a filter unit to relay D.

Although other sources of direct current such as a rectifier, can be used in place of or in combination with the battery B, the present disclosure will be confined, for simplification, to a battery.

Whenever relays D and DP are performing cyclical operations, contact 32 of relay DP alternately charges and discharges a capacitor 33; and such discharges are effected through the winding of a slow-release relay C. The slow-release characteristics of relay C are such that it will not release its armature during the time intervals between successive applications of energy to the relay winding from the capacitor. Relay C cannot, therefore, be held in a picked-up condition unless cyclical operations are performed by relays D and DP.

Relay C, in turn, controls the pick-up circuit for a penalty relay PR which, when actuated, operates the electro-pneumatic valve EPV. Whenever relay C is de-energized, relay PR becomes deenergized causing the valve EPV to be operated to cause an automatic service application of brakes. The valve EPV is operated to permit the release of the brakes whenever relays C and PR are energized. Relay PR is of the slow-release type and is provided with a stick circuit through a contact of an air reduction valve SAS. The air reduction valve is operated whenever the engineman acknowledges signaling restrictions and manually initiates braking operations. Thus, a manual acknowledgement of speed restricting conditions results in the closing of a stick circuit for the penalty relay PR; and an acknowledgement performed within the limits of the release time of relay PR prevents an automatic service application of brakes.

Whenever the cyclical operations of relays D and DP are interrupted for a time exceeding the release times of relays C and PR, automatic braking operations are initiated. Such interruptions can result either from excessive speeds or from circuit faults. In the case of excessive train speeds, the frequency of the output from the generator exceeds the frequency at which a selected filter passes generated energy. Thus, relay D is held energized by generated energy until train speed drops below the corresponding enforced limit. In the case of apparatus failure or open-circuit conditions, relay D is held deenergized until such conditions are corrected. By the same token, short-circuit conditions or applications of stray energy to the pick-up circuit for relay D result in the holding of relay D energized. Thus, the normal energization of relay D from the battery B provides a check on the continuity of the control circuits, while sustained energizations of relay D normally indicate excessive train speeds.

The electro-pneumatic valve EPV shown is assumed to be of the type described in the U.S. Patent No. 1,855,596 of C. S. Bushnell, dated April 26, 1932. When the solenoid structure of the valve EPV is energized, air is permitted to pass from the main reservoir into the airbrake control lines, thereby permitting the releasing of the brakes. When deenergized, valve EPV drains air from the brake control lines, causing the application of the brakes. Since, for the purpose of describing the present invention, only the general mode of operation of the valve EPV need be known, the foregoing brief description of the operation of the valve is sufficient; and reference is made to the above Bushnell patent for a complete description of the electro-pneumatic valve and its mode of operation.

More specifically, when the wayside speed control apparatus imposes low-speed restrictions on trains occupying the track section 10T, a code rate of 75 pulses per minute is applied to the rails. Similarly, code rates of 120 and 180 pulses per minute are applied by the control apparatus when medium-speed or high-speed conditions, respectively, exist.

The code following relay CR is periodically energized by the code pulses detected by the receiving coils 12 and 13. Relay CR is thereby operated at a rate determined by the rate of codes received.

Front contact 14 of relay CR is periodically opened and closed, causing the periodic energization of the front repeater relay CRFP. Relay CRFP is slow-acting in releasing its armature, and is capable of holding its armature when energized periodically at any of the specified code rates. Back contact 14 of relay CR causes the periodic energization of the slow-speed control relay 75R through front contact 15 of relay CRFP. Relay 75R is also assumed to have slow-release characteristics, and is capable of retaining its armature when periodically energized at any of the code rates.

Contact 16 of relay CR applies (+) energy to the two extremities, alternately, of the primary winding of the master transformer. The center of the primary transformer winding is connected directly to (−) energy. The direction of the magnetic flux in the code of the transformer is thereby periodically reversed, resulting in the induction of an alternating voltage across the output terminals of the secondary winding of the transformer. The transformer output is connected to the decoding units 120DU and 180DU which detect, respectively, code rates of 120 and 180 pulses per minute. The decoding units are thereby capable of energizing either the medium-speed control relay 120R or the high-speed control relay 180R, depending on the code rate detected.

Contacts of the described control relays 75R, 120R and 180R are used to select pick-up circuits for the detection relay D which is operated in accordance with the the speed of the locomotive. As previously described, under normal conditions, relay D is always energized by the battery B, and can be energized also by the output of the axle-driven generator G.

Assuming that the locomotive is stopped on the track section 10T and that slow-speed restrictions are in effect, relay D is energized by a pick-up circuit extending from the battery B and including a resistor 17, the winding 18 of the frequency generator G, front contact 19 of relay PR, front contact 20 of relay 75R, back contact 21 of relay 120R, back contact 22 of relay 180R, the low-speed filter unit L-MPH, back contact 24 of relay 180R, back contact 26 of relay 120R, front contact 27 of relay 75R, front contact 28 of relay PR, and a rectifier 29. It is evident that the pick-up circuit described for relay D under these conditions is completed by the common grounding of the battery B, the rectifier 29 and the filter unit L-MPH.

If medium-speed or high-speed restrictions are in effect when the locomotive is stopped on the track section 10T, relay D is energized through either the medium-speed or the high-speed detection filter units M-MPH and H-MPH in a similar manner. In other words, if medium-speed restrictions are in effect, front contacts 21 and 26 of relay 120R are closed to select the filter M-MPH; and if high-speed restrictions are in effect, front contacts 22 and 24 of relay 180R are closed to select a circuit through the filter H-MPH.

As previously noted, and as will be described in greater detail, the various filter units are arranged to pass direct current energy from the battery B at all times.

The relay D is thereby energized by any of three pick-up circuits, each of which detects a particular speed range. When relay D is energized its front contact 30 closes to energize the slow-acting repeater relay DP. Front contact 31 of relay DP closes to shunt the battery B, thereby deenergizing relay D. The subsequent opening of contact 30 of relay D deenergizes relay DP, which in turn, restores energy to relay D by the opening of its front contact 31. In this manner, relays D and DP perform self-imposed cyclical operations which occur at a rate dependent upon the slow-acting characteristics of relay DP. The resistor 17 limits battery current at times when front contact 31 of relay DP closes to shunt the battery B.

Since the battery B is connected in series with the winding 18 of the generator G, and since front contact 31 of relay DP is connected in parallel with the battery B (and resistor 17), the battery is effectively removed from the network by shunting, while a closed circuit for the output of the generator G is normally maintained at all times.

Relay DP acts to energize the control relay C in a periodic manner. When relay DP is energized, its front contact 32 closes a circuit for energizing the capacitor 33. When relay DP becomes deenergized, its back contact 32 closes a discharge path for the capacitor 33 through the winding of relay C. In this manner, relay C can be energized only when relay DP is alternately energized and deenergized; and relay C is assumed to be slow-acting to the extent that it can retain its armature during periodic energizations caused by the cyclical operations of relays D and DP.

The control relay C operates the penalty relay PR by controlling the pick-up circuit for relay PR which includes front contact 34 of relay C. The penalty relay PR, in turn, controls the operating solenoid of the electro-pneumatic valve EPV. Specifically, whenever relay PR is energized, its front contact 35 applies energy to the solenoid windings of valve EPV. When energized, the valve solenoid operates the valve EPV in a manner such that air is applied to the brake control lines of the train, permitting the release of the brakes. Therefore, the deenergization of the penalty relay PR results in the deenergization of the solenoid in valve EPV, causing the closing of valve EPV which causes the draining of air from the brake control lines, thereby initiating a service application of brakes.

The penalty relay PR is provided with a stick circuit which includes contact 36 of the air reduction valve SAS and front contact 37 of relay PR. The air reduction valve SAS is a manually operable speed acknowledgment device of the well-known type which can be actuated by the engineman. A manual operation of the valve SAS closes the stick circuit for relay PR, thereby preventing an automatic application of the brakes. However, it should be evident that the valve SAS is operable to prevent automatic braking only when the engineman manually applies brakes to restrict train speed in compliance with signaling conditions; and manual braking operations must take place before relay PR releases its armature.

Under the conditions described wherein a train is assumed to be stopped on the track section 10T, the relays D and DP perform cyclical operations irrespective of imposed signaling restrictions as long as energy is applied to the relays by the battery B through one of the pick-up circuits described. Should open circuit conditions arise relays D and DP are steadily deenergized resulting in the deenergization, in sequence, of the slow-acting relay C, the penalty relay PR and the electro-pneumatic valve EPV. Therefore, brakes are automatically applied when the continuity of any selected one of the pick-up circuits is interrupted, thereby indicating that a circuit failure exists. On the other hand, the incidence of stray energy which might cause the sustained energization of relay D and/or DP also results in the deenergization of relays C and PR, which in turn cause the valve EPV to automatically apply the brakes.

Assuming now that the train is in motion on the track section 10T, the operation of relays D and DP is essentially the same as previously described, as long as such operations are in response to energy supplied by the battery B. The generator G applies energy to a selected one of the three described pick-up circuits for relay D in accordance with detected signaling restrictions. The frequency of the generator output is proportional to the speed of the locomotive. Therefore, a comparison between locomotive speed and speed restrictions is made through a selected pick-up circuit through one or the other of the filter units.

More specifically, assume that low-speed restrictions are in effect and the train is travelling at a speed below the upper limit of the low-speed range. Relay 75R is energized while relays 120R and 180R are deenergized, thereby applying energy from both the battery B and the generator G to the low-speed filter L-MPH. Since the frequency of the generator output is below the pass-band of the filter, only energy from the battery B is passed by the filter, resulting in cyclical operations of relays D and DP. If the speed of the locomotive exceeds the upper limit of the low-speed range, the frequency of the generator output falls within the pass-band limit of the filter L-MPH, and generator energy is passed by the filter to energize relay D through the rectifier 29. Therefore, relay D is held energized by the generator output energy. Since, as previously described, relay D must be alternately energized and deenergized in order to maintain energization of relay C, relay C releases its armature and opens its front contact 34, thereby causing the deenergization of the penalty relay PR. The subsequent opening of front contact 35 of relay PR causes the deenergization of the solenoid in the electro-pneumatic valve EPV, thereby causing an automatic application of brakes.

Similar conditions exist when either medium-speed or high-speed restrictions are in effect. Relays 75R, 120R and 180R are selectively energized to cause both battery and generated energy to be applied to either the medium-speed filter M-MPH or the high-speed filter H-MPH. If the speed of a locomotive, under conditions of medium-speed restrictions, is such that the output frequency of the generator falls within the pass-band of the filter M-MPH, relay D is caused to be steadily energized. Under high-speed conditions, a generated frequency in excess of the lower limit of the pass-band of the filter H-MPH causes steady energization of relay D through that filter.

After brakes have been applied automatically in any of the manners previously described, the speed of the train decreases. The frequency of the output of the generator G decreases accordingly, and the generated frequency ultimately falls below the pass-band of the particular filter selected for use by the speed control relays 75R, 120R and 180R. When this occurs, the particular filter cuts off the supply of generated energy to relay D; and relay D can be energized by only the battery B. The cyclical operations of relays D and DP are resumed, causing relays C and PR to be energized. The subsequent energization of the solenoid of valve EPV causes the actuation of the valve, thereby admitting air to the brake control lines and permitting the releasing of the brakes.

Assuming that the engineman controls train speeds in accordance with signal indications, automatic brake applications will not occur. If wayside signals only are employed, the engineman controls train speed to conform with speed restrictions dictated by such signals. It is evident that conditions existing in advance of a signal at the time a train passes the signal can change while the train occupies the block protected by the signal. In other words, changes in traffic and/or control circuit conditions can occur which require that more restrictive speed conditions be imposed. The engineman would have no knowledge of the impending restrictions and would be unable to reduce train speed accordingly, the result being that automatic brake application would be effected. Therefore, audible and/or visual warning should be given to the engineman so that he can act to reduce train speeds. Such would also be the case if cab signals were employed; and many of the well-known cab signaling systems include audible warning devices to call the attention of the engineman to signaling changes. Therefore, a warning device represented as a bell BX in the accompanying drawings is provided to detect the imposing of more restrictive speed conditions. The bell BX is actuated whenever excessive train speeds are detected, resulting as described in deenergization of relay C. The closing of back contact 38 of relay C energizes the warning bell BX, thereby warning the engineman and giving him an opportunity to effect manually a reduction in train speed; and such manual operations prevent the dropping away of the penalty relay PR, which, in turn, controls the EP valve.

The various filter units have been generally described as being able to pass generated energy whenever the frequency exceeds the frequency corresponding to the upper limit of the speed ranges associated with respective filter units; and the filters have been also described as being able to pass direct current energy. In Fig. 2 one form of high-pass filter which can be used in the present invention is shown. The series portion of the filter consists of an inductor 40 connected in parallel with a capacitor 41, while two inductors 42 and 43 form the shunt portion of the filter. Thus, the filter unit shown is of a standard high-pass type having a path for direct current through the inductor 40. The detection relay D can therefore receive direct current energy through any selected filter unit, thereby actuating the relay D as described. It must be noted that the resistances of the inductors 42 and 43 must be high enough so that these inductors do not, in effect, shunt relay D.

The relative values of inductance and capacitance in a filter unit of this type are selected to permit the passing of particular generated frequencies to be detected, as in the cases of the filter units L-MPH, M-MPH and H-MPH.

In view of the preceding descriptions, it can be seen that an effective speed control system is provided, and that a positive check of the integrity and continuity of the control circuits is provided by the direct current means in conjunction with the particular filter units which are capable of passing direct current energy. It should be evident that other filtering means can be used in conjunction with the present invention, as long as the essential elements illustrated in Fig. 2 are provided, thereby permitting free passage of direct current energy.

Having described a train speed control system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. A train control system having train-carried apparatus comprising in combination, an axle-driven frequency generator, an electro-pneumatic valve effective when deenergized to cause application of the brakes of the train, a plurality of high-pass filters, each filter being effective to block a different range of frequencies and being capable of passing direct current, track circuit code receiving means effective to select one of said filters dependent upon the particular track circuit code rate received, a detector relay having a slow drop-away repeater relay repeating corresponding conditions of said detector relay, a source of direct current connected in parallel with a front contact of said repeater relay and connected in series with the winding of said generator, circuit means including said source of direct current, the winding of said generator and said selected one of said filters in series for energizing said detector relay and thereby actuating said slow drop-away relay to close said front contact and shunt said source of direct current and thus cause the pulsing of said slow drop-away relay, a control relay, circuit means for maintaining said control relay picked up only provided that said slow drop-away relay is intermittently actuated, and circuit means dependent upon said control relay being picked up for energizing said electro-pneumatic valve.

2. A train control system having train carried apparatus comprising in combination, an axle driven frequency generator operable to generate alternating current at a frequency proportional to the speed of the train, an electro-pneumatic valve, means controlled by the valve in its deenergized position for causing application of the brakes of the train, a condenser, a slow drop-away relay, means controlled by the relay when picked up for causing energization of said electro-pneumatic valve, a high-pass filter capable of passing direct current energy, a source of direct current, means including a two-position control relay for normally energizing said slow drop away relay by the intermittent discharge of said condenser, said means being effective when the control relay is in one position to cause the charging of said condenser and in the other position to cause the discharging of said condenser through the winding of said slow drop-away relay, and circuit means for normally intermittently energizing said two-position control relay, said circuit means including energy feeding intermittently from said source of direct current through a winding of said frequency generator and said high-pass filter and thereby normally maintaining said slow drop-away relay picked up to provide energization for said electro-pneumatic valve, and said circuit means being effective to cause the steady energization of said two-position control relay as a result of relatively high frequency alternating current passing through said high-pass filter from said generator at a relatively high train speed whereby said slow drop-away relay becomes dropped away to deenergize said electro-pneumatic valve for applying the train brakes.

3. A train control system having train carried apparatus comprising in combination, an axle driven frequency generator operable to generate alternating current of a frequency proportional to the speed of the train, an electro-pneumatic valve, means controlled by the valve in its deenergized position for causing application of the brakes of the train, a condenser, a slow release relay, means for normally maintaining said slow release relay picked up, a high-pass filter effective to pass direct current and only alternating current output of said generator above the frequency generated at a predetermined axle speed, a control relay, circuit means including a contact of said control relay for alternately charging said condenser and discharging said condenser through a winding of said slow release relay whereby said slow release relay is normally maintained picked up, circuit means including a winding of said generator and said filter in series for energizing said control relay by the output of said generator when the train reaches said predetermined axle speed, said circuit means also having a source of direct current connected in series with said winding of said generator whereby said control relay is also subject to energization as a result of direct current energy checking continuity of a substantial portion of said circuit means including said filter, said circuit means including a front contact of said control relay shunting said source of direct current whereby intermittent actuation of said control relay is normally effected, said circuit means being effective to maintain said control relay steadily energized by reason of alternating current feeding through said high-pass filter from said generator only at times when the speed of the axle is above said predetermined speed, and means for maintaining said electro-pneumatic valve energized dependent upon the picked up condition of said slow release relay, whereby said electro-pneumatic valve is normally maintained energized as a result of the intermittent actuation of said control relay and sustained energization of said control relay causes the dropping away of said slow release relay and the subsequent deenergization of said electro-pneumatic valve to cause application of the brakes of the train.

4. A train control system having train-carried apparatus comprising in combination, an axle driven frequency generator operable to generate alternating current of a frequency proportional to the speed of the train, a source of direct current, an electro-pneumatic valve, means controlled by the valve in its deenergized position for causing application of the brakes of the train, a plurality of high-pass filters, the several filters being effective to pass only alternating current frequencies generated by said frequency generator above different predetermined axle speeds and being capable of passing direct current, track circuit code receiving means inductively coupled to the track rails for sensing the currents applied to the track rails, registering means for registering the different currents received by said receiving means, means controlled by said registering means for selecting one of said filters corresponding to the current received through the track rails, a detector relay, a slow drop-away repeater relay, means for operating said repeater relay to repeat the condition of said detector relay, circuit means including in series said selected one of said filters and the output of said generator for energizing said detector relay from the output of said generator only provided that the generator winding frequency is above the frequency corresponding to said predetermined axle speed for the filter selected, said circuit means also being effective to energize said detector relay from said source of direct current through said generator and said selected filter, and said circuit means having a front contact of said repeater relay shunting said source of direct current whereby said detector relay and said repeater relay are intermittently operated except when said detector relay is steadily energized from the output of said frequency generator through the selected filter, and circuit means for energizing said electro-pneumatic valve provided that said repeater relay is intermittently actuated, said circuit means being effective upon steady energization of said repeater relay to deenergize said electropneumatic valve and thereby cause application of the brakes of the train.

5. A train control system having train carried apparatus comprising, an axle driven frequency generator operable to generate alternating current at a frequency proportional to the speed of the train, an electropneumatic valve, means controlled by the valve in its deenergized position for causing application of the brakes of the train, a plurality of high-pass filters for different frequencies comparable to output frequencies of said generator at predetermined train speeds, said filters being capable of passing direct current, train control receiving means inductively coupled to the track rails for sensing the currents applied to the track rails, registering means for registering the different currents received by said receiving means, means controlled by said registering means for selecting one of said high-pass filters corresponding to the current received through the track rails, a source of direct current connected in series with the output winding of said generator, a detector relay, a slow drop away repeater relay means controlled by said detector relay for repeating the condition of said detector relay, circuit means for energizing said detector relay from the output of said source of direct current through the output winding of said generator and through one of said filters selected by said registering means, means for shunting said source of energy controlled by said repeater relay in a picked up position, whereby said detector relay is periodically energized at a rate determined by the slow drop away characteristics of said detector repeater relay, said circuit means also rendering said detector relay subject to energization from said generator through said selected filter when the frequency of the generator is within the pass-band of the filter, and electro-responsive means for maintaining said electropneumatic valve energized provided that said detector relay is periodically actuated.

References Cited in the file of this patent

UNITED STATES PATENTS

| | | |
|---|---|---|
| 2,374,792 | Van Horn | May 1, 1945 |
| 2,607,002 | Failor | Aug. 12, 1952 |
| 2,703,839 | Judge | Mar. 8, 1955 |
| 2,721,258 | Freehafer | Oct. 18, 1955 |